(12) United States Patent
Starostin et al.

(10) Patent No.: US 7,913,309 B2
(45) Date of Patent: Mar. 22, 2011

(54) INFORMATION RIGHTS MANAGEMENT

(75) Inventors: Dmitry V Starostin, Aachen (DE); Joris Claessens, Heverlee (BE); Alexey Orlov, Aachen (DE)

(73) Assignee: Microsoft Corporation, Redmond, VA (US)

( * ) Notice: Subject to any disclaimer, the term of this patent is extended or adjusted under 35 U.S.C. 154(b) by 935 days.

(21) Appl. No.: 11/762,619

(22) Filed: Jun. 13, 2007

(65) Prior Publication Data

US 2008/0313699 A1 Dec. 18, 2008

(51) Int. Cl.
G06F 7/04 (2006.01)
G06F 17/30 (2006.01)
H04N 7/16 (2006.01)
H04N 7/167 (2006.01)
B41K 3/38 (2006.01)
H04L 9/08 (2006.01)

(52) U.S. Cl. ............. 726/26; 726/2; 380/59; 380/201; 380/278; 725/25

(58) Field of Classification Search ............ 726/26
See application file for complete search history.

(56) References Cited

U.S. PATENT DOCUMENTS

| | | | |
|---|---|---|---|
| 2002/0087859 A1* | 7/2002 | Weeks et al. | 713/156 |
| 2004/0039594 A1* | 2/2004 | Narasimhan et al. | 705/1 |
| 2005/0216901 A1* | 9/2005 | Speare et al. | 717/168 |
| 2005/0257271 A1* | 11/2005 | Lafornara et al. | 726/26 |
| 2006/0218643 A1* | 9/2006 | DeYoung | 726/26 |
| 2006/0265599 A1* | 11/2006 | Kanai | 713/182 |
| 2007/0038567 A1* | 2/2007 | Allaire et al. | 705/50 |
| 2007/0094311 A1* | 4/2007 | Pelletier et al. | 707/204 |
| 2007/0130662 P1 | 6/2007 | Delabroye | |

OTHER PUBLICATIONS

Bertino, et al., "Secure and Selective Dissemination of XML Documents, ACM Transactions on Information and System Security", vol. 5, No. 3, Aug. 2002, pp. 290-331.
Bhatti, et al., "A Policy Framework for Access management in Federated information Sharing", In Proceedings of 2005 IFIP TC-11 WG 11.1 and WG 11.5, Joint Working Conference on Security Management, Integrity and Internal Control in Information Systems, Dec. 2005, 17 pages.
Dragovic, et al., "Context-Adaptive Information Security for UbiComp Environments", 2004, University of Cambridge Computer laboratory, 2 pages.
"Technical Overview of Windows Rights management Services for Windows Server 2003", Microsoft Corporation, Nov. 2003, Updated Apr. 2005, 29 pages.

* cited by examiner

*Primary Examiner* — Nasser Moazzami
*Assistant Examiner* — Oscar A Louie
(74) *Attorney, Agent, or Firm* — Lee & Haynes, PLLC

(57) ABSTRACT

Information rights management (IRM) systems enable information to be protected after it has been accessed by or delivered to an authorized individual. For example, this might be to allow an email to be viewed for a limited time by specified individuals but to prevent that email from being forwarded. However, existing IRM systems are limited in the situations in which they may operate. An IRM server is provided which communicates with one or more policy evaluators which are independent of the IRM server. Results from the different policy evaluators may be combined by the IRM server and one or more identity providers may be used in conjunction with each policy evaluator. By enabling the IRM server to act as a broker between authors, recipients and policy evaluators situations in which IRM systems may operate are greatly extended.

20 Claims, 10 Drawing Sheets

| | |
|---|---|
| 600 | Owner |
| 601 | Validity time |
| 602 | Use license acquisition endpoint reference |
| 603 | Content information rights information section |
| 604 | Content reference |
| 605 | Content key |
| 606 | Granted information rights |
| 607 | Content acquisition rights validity time |

FIG. 6

INFORMATION RIGHTS MANAGEMENT

BACKGROUND

Information rights management systems enable information to be protected after it has been accessed by or delivered to an authorized individual. They typically use persistent usage policies which remain with information when that information is transferred. For example, consider a chief executive officer (CEO) who wishes to send an email message that contains confidential information about a forthcoming reorganization to his or her executive staff. Using an information rights management system enabled email application, such as those currently known, the CEO is able to select a template to specify that recipients may read the email message but not copy, paste, edit or forward that message. When the recipients receive the email message they are able to view it using the email application. The email application enforces the permissions so that the recipients are unable to copy, paste, edit or forward the message. Existing information rights management systems also enable other policies to be used. For example, the CEO might set a time limit after which the recipients are no longer able to view the email. These types of restrictions can also be applied to intranet content and electronic documents using known information rights management systems.

Typically information rights management systems are implemented in a single organization, enterprise or trust domain and may be known as Enterprise Rights Management (ERM) systems.

Existing information rights management systems can only be applied in limited situations.

The embodiments described below are not intended to be limited to implementations that solve any or all of the noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Information rights management (IRM) systems enable information to be protected after it has been accessed by or delivered to an authorized individual. For example, this might be to allow an email to be viewed for a limited time by specified individuals but to prevent that email from being forwarded. However, existing IRM systems are limited in the situations in which they may operate. An IRM server is provided which communicates with one or more policy evaluators which are independent of the IRM server. Results from the different policy evaluators may be combined by the IRM server and one or more claim providers may be used in conjunction with each policy evaluator. By enabling the IRM server to act as a broker between authors, recipients and policy evaluators situations in which IRM systems may operate are greatly extended.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is an example of a use license data structure;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "information rights policy" refers to one or more conditions or criteria which must be met before granting the right to perform specified actions on data, such as "read", "write", "print" or "forward". This differs from policies which might be used to control whether data may simply be obtained from a source without any control over later actions on that data such as its dissemination, "read", "write" etc.

The term "identity provider" is used herein to refer to an entity which is able to issue authentication tokens to authenticate another entity to an information rights management system.

The term "claim provider" is used to refer to an entity which is able to issue authorization tokens with claims which may be used by a policy evaluator of an information rights management system.

In some cases, a claim provider may also act as an identity provider although this is not essential.

Figure 1:
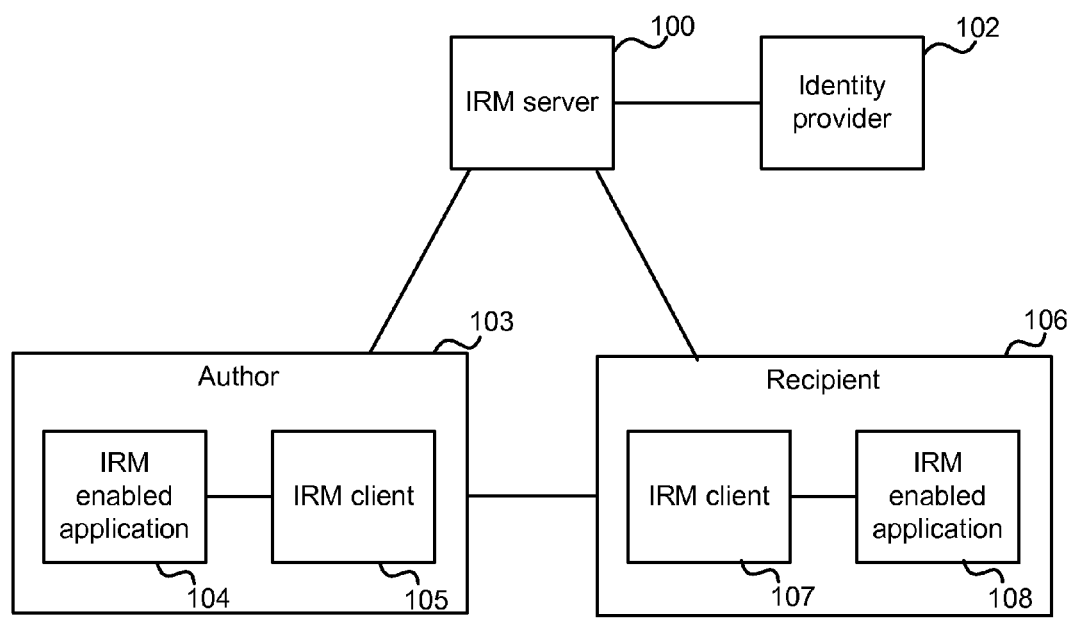
FIG. 1 is a schematic diagram of an information rights management system.

Consider the information rights management (IRM) system of FIG. 1. This comprises an IRM server 100, an identity provider 102, an author 103 and a recipient 106 all connected by a communications network. The author 103 comprises an IRM client 105 and an IRM enabled application such as an email application for example. The recipient 106 also comprises an IRM client 107 and the same IRM enabled application 108 as available at the author 103. There may be many more recipients and authors although these are not shown in FIG. 1 for clarity.

The author registers with the IRM server and receives a user certificate from the IRM server.

Figure 2:
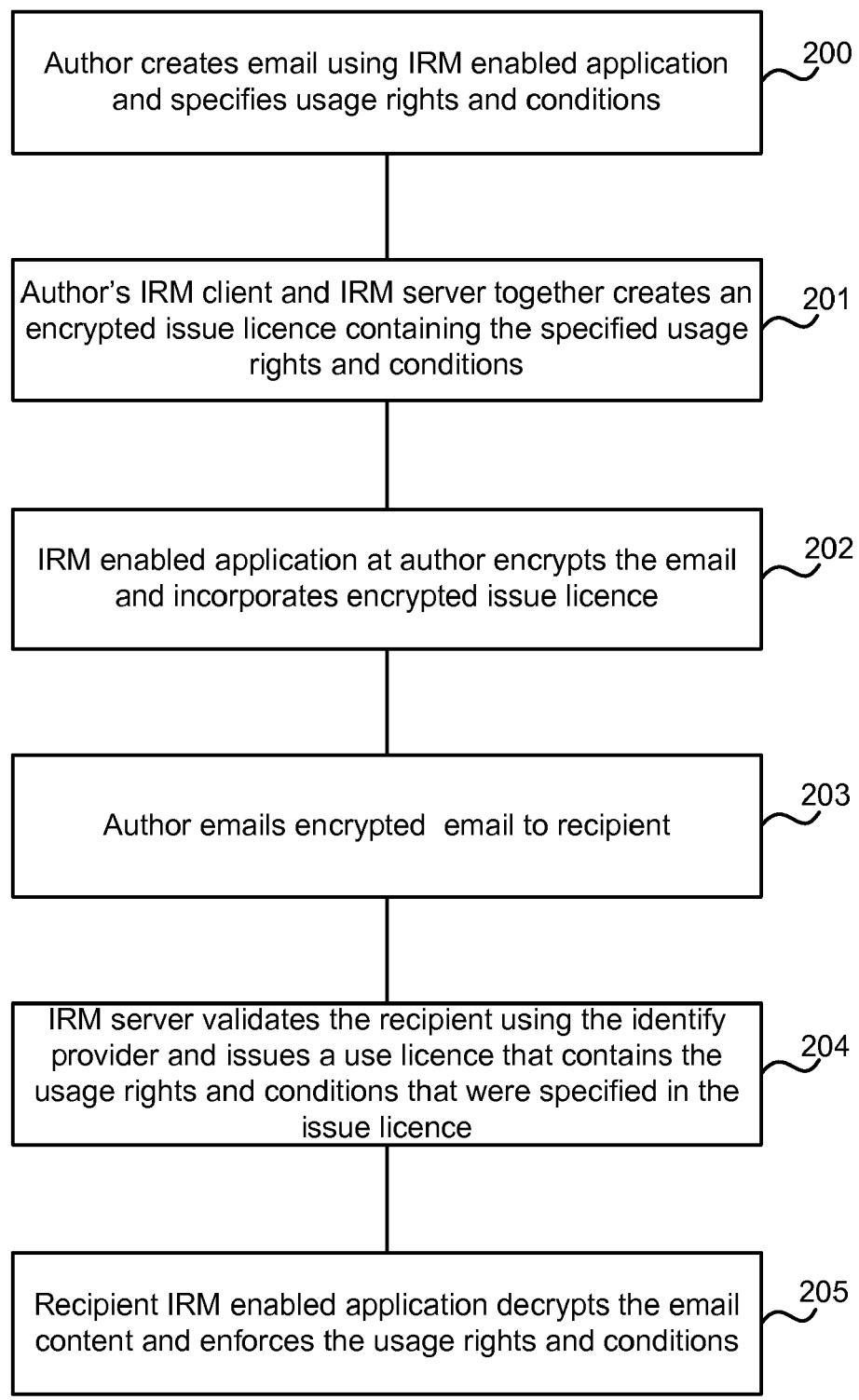
FIG. 2 is a block diagram of a method of using an information rights management system.

Suppose that the author 130 requires to send an email to a specified group of recipients whilst ensuring that an information rights policy is enforced so that the recipients are able to view the email but not print, copy, edit or forward that email. Referring to FIG. 2, the author creates the email using the IRM enabled application and specifies usage rights and conditions for the email (block 200). Those usage rights and conditions together form an instance of an information rights policy. For example, in this case, the conditions include that the recipient should be a member of a specified group of recipients and the usage rights include that the recipients may only view the email. The author's IRM client and the IRM server together create an encrypted issue license containing the specified usage rights and conditions (block 201). For example, the IRM server generates the issue license and sends this to the IRM client. The IRM enabled application 104 or IRM Client 105 at the author encrypts the email and incorporates the encrypted issue license into that email (block 202). The issue license is encrypted with a symmetric key which is then encrypted to a public key of the IRM server. The encrypted key is inserted into the encrypted issue license. As a result only the IRM server is able to issue a use license to decrypt the file.

The author then emails the encrypted email to the recipient (block 203). The recipient opens the file using the IRM enabled email application 108 and sends a request for a use license to the IRM server. The request includes the recipient's public key and the issue license which contains the symmetric key that encrypted the file. The IRM server validates the recipient as being in the specified group using the identity provider 102 and creates and issues a use license that contains the usage rights and conditions that were specified in the issue license (block 204). During this process, the IRM server decrypts the symmetric key using its private key and adds the encrypted session key to the use license. This step ensures that only the intended recipient can decrypt the symmetric key and thus decrypt the protected file. Using the use license, the recipient IRM enabled application 107 or IRM Client 108 then decrypts the email content and enforces the usage rights and conditions (block 205). In the IRM system described above with reference to FIGS. 1 and 2 the IRM server itself validates the information rights policies and is the only entity able to do this and to issue use licenses. In addition, only a pre-specified, limited list of authentication tokens may be used. Also the language used to express the information rights policy is fixed.

It is recognized here that this is restrictive in situations where it is required to allow different types of information rights policy validation process, perhaps using third party information rights policy validation systems. For example, the author has no choice over the type of information rights policy validation process used. In addition, different types of information rights policy validation process may require input from different sources of information about recipient; that is, different claim providers. However, the architecture of FIG. 1 only enables a single identity provider 102 to be used as source of the authentication token to authenticate a user to the IRM server and the same token is used as an authorization token to validate the information rights policy. In addition, the identity provider is one of a pre-specified list of supported identity providers for interaction with the IRM server 100.

For example, consider a situation in which data is created using a first application. That application has functionality to specify user roles which may be used to specify an information rights policy using an IRM system such as that described above. In this case the identity provider for the IRM system comprises a system for checking the user roles of the application.

Suppose that it is required to export the created data to a second application. The data is saved using that second application and is then disseminated. However, it is required to use an information rights policy to control use of the disseminated data. The second application does not have understanding of the user roles of the first application and so that information cannot easily be used to set up the information rights policy. Instead another identity provider needs to be used which is associated with the second application. However, this is inconvenient in many situations and can lead to errors and/or failure to specify information rights policies at all. This is because it is usually more straightforward to allow an author to specify information rights policy information using the first application in which the data is created.

An Exemplary System

Figure 3:
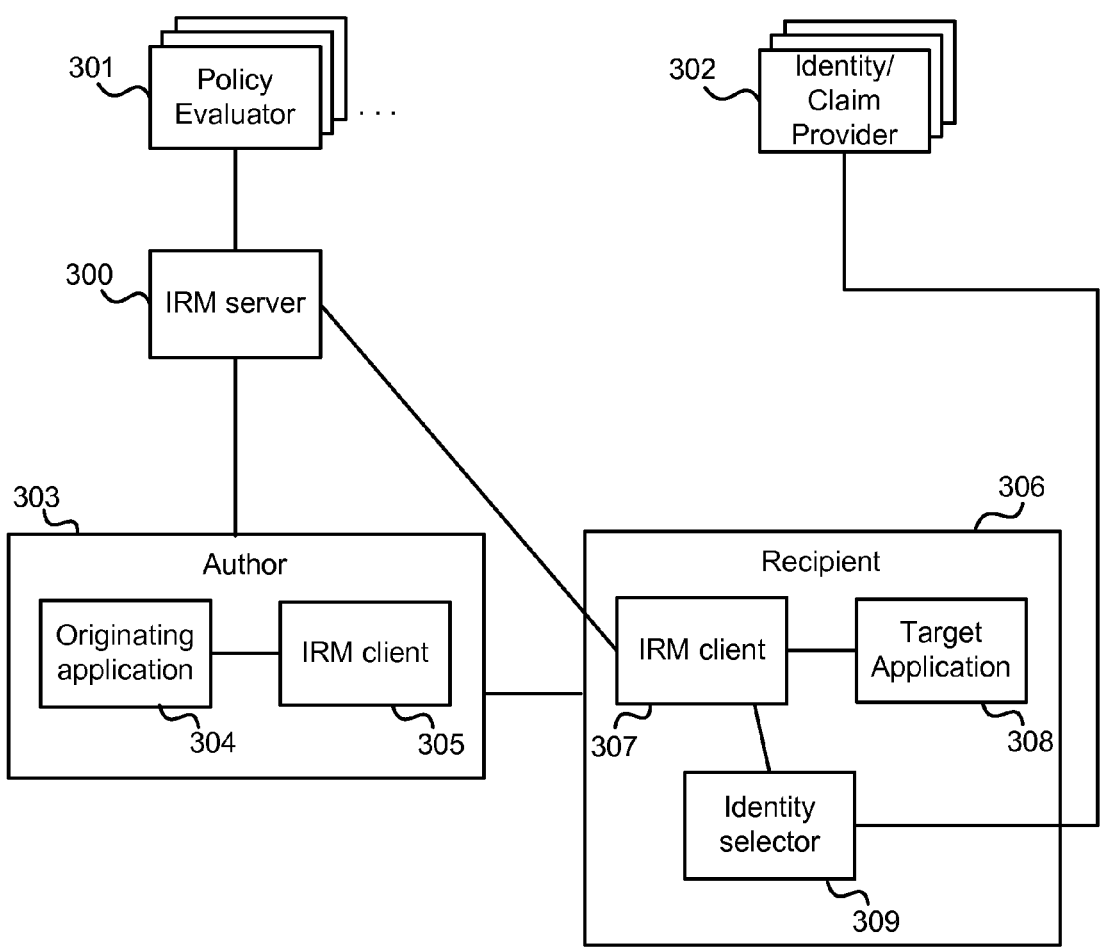
FIG. 3 is a schematic diagram of another example information rights management system.

FIG. 3 is a schematic diagram of an improved information rights management system. It comprises an IRM server 300, one or more policy evaluators 301 in communication with the IRM server 300, and an IRM client 305, 307 at each author 303 and recipient 306. Only one author and recipient are shown for clarity although in practice there may be many more such authors and recipients. The information rights management system may be used in an arrangement such as that illustrated in FIG. 3. Each author also comprises an originating application which provides functionality at least to create data and to specify information rights policy information. Each author is in communication with the IRM server 300 and with recipients 306 via a communications network of any suitable type.

Each recipient comprises a target application 308 for carrying out actions such as viewing or reading information controlled using the IRM system. The target application 308 is in communication with the IRM client 307 at the recipient 306. That IRM client 307 is also in communication with an identity selector 309 at the recipient. The identity selector is in communication with one or more claim providers 302. In this case one or more of the claim providers also act as identity providers. However, this is not essential. The claim providers and identity providers may be separate entities.

In contrast with the system described above with reference to FIG. 1 it is not essential for the IRM server 300 of FIG. 3 to validate information rights policies itself. Instead policy evaluators 301 may perform that function instead of or in addition to the IRM server itself. The IRM server can be thought of as acting as a broker between the authors 303, policy evaluators 301, claim providers 302, and recipients 306. Several different claim providers 302 may be used in contrast to the situation of FIG. 1. Also, it is not essential for the originating application 304 and the target application 308 to be the same as in the example described above with reference to FIG. 1. In this way the information rights decision component (IRM server) can be thought of as being decoupled from the identity (authentication) and policy mechanism (authorization).

In some examples the architecture of FIG. 3 is modular in that different policy evaluators 301 may be plugged into the system. For example, these may be bespoke policy evaluators and may be application specific or application independent. In addition, different claim providers may be plugged in and if a plurality of claim providers are available, dynamic selection of one or more of these is possible as described in more detail below.

Exemplary Method

Figure 4:
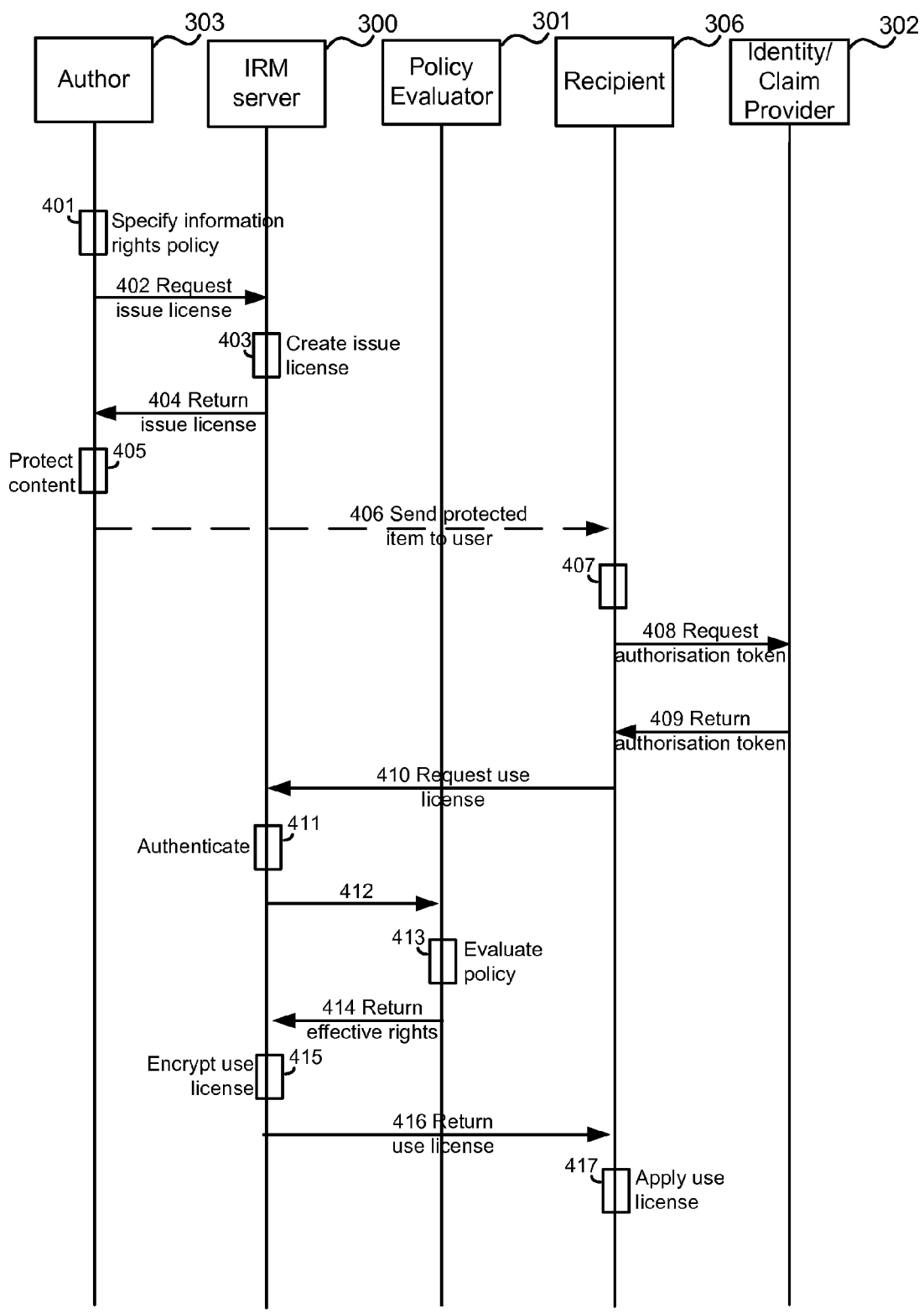
FIG. 4 is an example message sequence chart for a method of operation of an information rights management system.

FIG. 4 is a high level message sequence chart for an example method of operation of the IRM system of FIG. 3. Each vertical line in the chart represents an entity of the IRM system or an entity with which the IRM system interacts and the same reference numerals are used for these entities as those used in FIG. 3. Arrows between the vertical lines represent messages sent between the entities and the relative position of those arrows with respect to one another represents the sequence of the messages in time. Processes carried out at the entities themselves may be represented using rectangles on the vertical lines. Only one policy evaluator and one claim provider and combined identity provider are shown for clarity. However, in practice, more than one policy evaluator may be used and more than one claim provider.

At the author machine or system, information is received or generated automatically to specify an information rights policy (block 401) for content that it is required to control use of. For example, this information may be automatically generated using pre-specified rules or criteria or may be specified by an end user. More detail about how this information may be specified is given later.

The content that it is required to control use of may be provided in one or more parts each of which may have its own specified information rights policy information.

The author machine 303 sends a request message (arrow 402) for an issue license to the IRM server 300. This request message comprises the information about the specified information rights policy. The request message may take a similar form as that used in the system of FIG. 1.

The IRM server 300 creates an issue license (block 403). It encrypts a content key on a public key of the Author. This process may take a similar form to that described above with reference to FIGS. 1 and 2 although the method of creating the issue license and the issue license itself takes a different form from that used in the method of FIG. 2.

The created issue license is sent from the IRM server to the author (arrow 404). The IRM client at the author decrypts the content key and uses that key to encrypt the content parts. The issue license is attached to the encrypted content parts and together these are sent to the recipient (dotted arrow 406). For example, the issue license is attached to an encrypted email, document or other protected item and this is sent to the recipient.

The recipient requests information rights to the content in order to perform an operation such as reading that content (block 407). The recipient is able to access information from the issue license about the specified claim requirements (of the specified information rights policy) because that information is not encrypted. The IRM client at the recipient then requests one or more authorization tokens with claims from a claim provider (message 408) which would fall within the specified claim requirements. The recipient then receives one or more security tokens from the identity provider (message 409).

The recipient generates and sends a use license request (arrow 410) to the IRM server. The use license request comprises the issue license, the received authorization tokens and optionally a list of actions relevant to the target application.

The IRM server then proceeds to authenticate the recipient (block 411). This authentication process is carried out in any suitable manner, such as that described above with reference to FIGS. 1 and 2. For example, authentication tokens obtained from an identity provider are used for this purpose. This authentication process is not illustrated in detail in FIG. 4 for reasons of clarity. The next part of the process is concerned with authorization.

The IRM server accesses information about the information rights policy from the issue license. This information comprises information about which type or types of information rights policy apply in this case. This information is used to identify the relevant policy evaluators to be used. That is, each type of information rights policy is associated with a particular policy evaluator.

Once the IRM server has identified which one or more policy evaluators are to be used, it forwards the use license request to each of those policy evaluators (arrow 412). Note that in FIG. 4 only one policy evaluator is shown for clarity but it is also possible to use more than one policy evaluator. As before, the use license request comprises the issue license, the authorization tokens, and the actions list requested by the target application.

Each policy evaluator that receives a request message (arrow 412) then proceeds to carry out an evaluation. The policy evaluator input parameters comprise the information rights policy information from the issue license, the authorization tokens, and a list of actions to query. The policy evaluator output comprises a list of granted actions also referred to as effective rights. This output is returned to the IRM server (arrow 414). During the evaluation process the policy evaluators are carrying out an authorization process in contrast to the authentication process previously carried out at block 411.

In the case that evaluation results are received at the IRM server 300 from two or more policy evaluators the IRM server combines or aggregates the lists of effective rights on the basis of a combination description held in the issue license. For example, the combination description is a Boolean expression such as AND. In this case the aggregated list of effective rights comprises the intersection of the lists of granted actions in the individual policy evaluator results. If the combination description is the Boolean expression OR, the aggregated list of effective rights comprises the union of the lists of granted actions in the individual policy evaluator results. Any suitable method of combining or aggregating the lists of granted actions may be used.

If there are some allowed actions in the policy evaluator response the IRM server proceeds to decrypt the content key from the issue license. The IRM server also proceeds to encrypt and sign corresponding parts of a use license for the particular recipient (block 415). This process may be similar to that described above with respect to FIG. 1. The use license is then sent to the recipient (arrow 416).

At the recipient the IRM client receives the use license. The IRM client uses its private key to decrypt the content key and then uses that decrypted key to decrypt the corresponding content part. The use license is applied (block 417) such that only the effective rights may be applied to the content.

Figure 5:
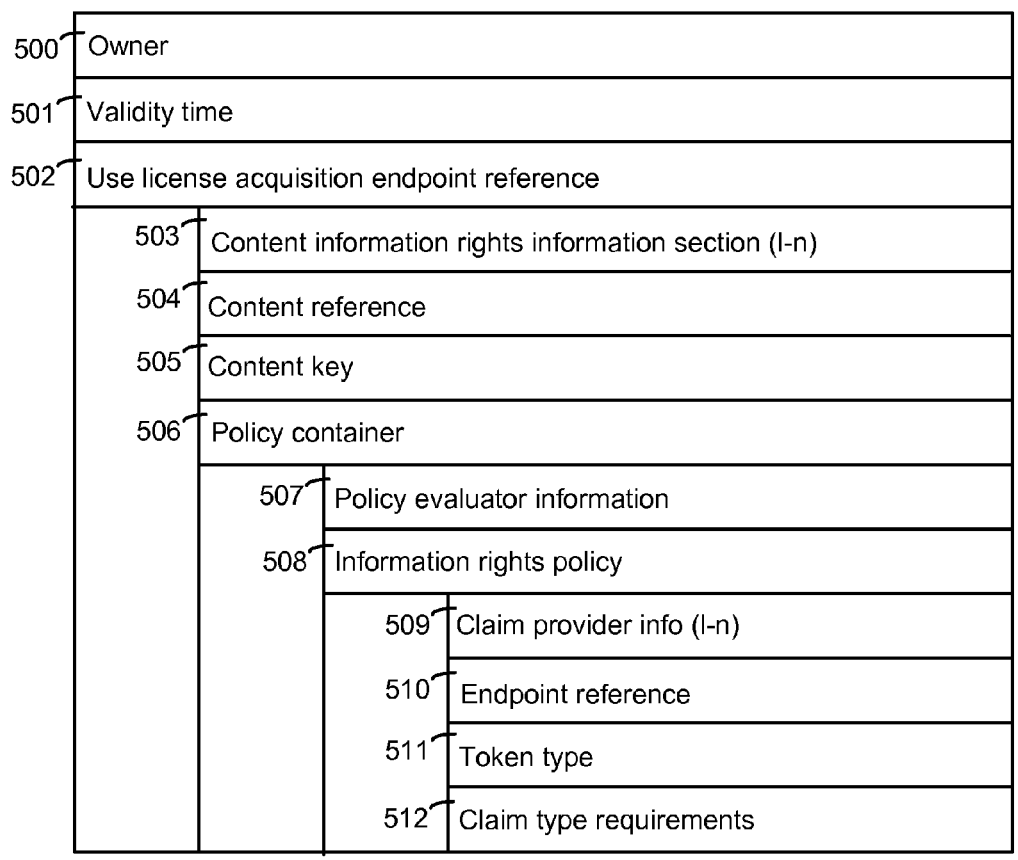
FIG. 5 is an example of an issue license data structure.

An example of an issue license data structure is now given with reference to FIG. 5. It comprises an owner field or part 500 which is used to store information about the author who created the issue license and who requires to protect the content. For example, this information may comprise information from the IRM server which identifies the author such as an authorization token or internal credentials. Optionally, display attributes may be stored with the owner information in order to specify how the owner information is to be presented to targeted recipients.

The issue license data structure may also comprise a validity time part 501. This may be used to store information about a time at which the issue license itself will expire.

A use license acquisition endpoint reference part 502 may be provided to store an endpoint reference to the IRM server to which a use license request is to be sent. This is the endpoint reference of the issuing IRM server. In some embodiments in which federation is used this information may be modified.

The issue license data structure may comprise one or more content information rights information sections 503. Each of these may comprise a content reference part 504, a content key part 505, a policy container part 506 and one or more policy evaluation information parts 507 (one for each policy evaluator to be used).

The content reference part 504 may be used to store a URI or other identifier for a content part in the scope of the originating application. The content key part 505 may be used to store a key that is used to encrypt the content part data. It may be encrypted with the IRM server public key.

The policy container part 506 is used to store policy description information that encapsulates the information rights policies for the specific content part. This part may also comprise information about how to combine or aggregate the evaluation results of different policy evaluators in to a single information rights result. It is also possible for the policy container part to be used to store a reference to another location where this information is stored.

Each of the policy evaluator information parts 507 comprises an information rights policy part 508 and one or more claim provider information parts 509. The information rights policy part 508 may be used to store information that is to be sent to a policy evaluator. For example, this may comprise conditions and identity information that is to be evaluated. This information may be encrypted using the IRM server public key.

Each claim provider information part 509 comprises data about a claim provider. These data may be stored using one of more of the following parts: endpoint reference part 510, a token type part 511, claim requirements part, and/or other decriptors.

The policy container 506 is able to encapsulate multiple, and different types of, information rights policies. This enables the content information rights information section 503 to deal with more than simply a single information rights description. Also, the policy container comprises information that enables results from more than one policy evaluator to be combined into a single information rights result.

The issue license also enables, for each information rights policy description, information to be provided regarding the required authorization tokens needed for policy evaluation.

An example of a use license data structure is now given with reference to FIG. 6. The use license data structure may comprise an owner part 600 for storing information about the author of the issue license. This information may be copied from the issue license. A validity time part 601 is also provided which may also be copied from the issue license.

A use license acquisition endpoint reference part 602 may be provided to store a use license request endpoint reference of the IRM server. In embodiments using federation this endpoint reference may be changed as described in more detail below.

A content information rights information section 603 is provided comprising a content reference part 604, a content key part 605, a granted information rights part 606 and a content information rights validity time part 607. The content reference part 604 may be used to store a URI or other identifier for a content part in the scope of the originating application. This information may be copied from the issue license. A content key part 605 may be used to store a key to decrypt the content part data. It is encrypted with the recipient's public or symmetric key associated with a token that was used to authenticate to the IRM server. The granted information rights part 606 may be used to store a list of allowed actions for the particular recipient in the particular context. It may be encrypted with the recipient's public or symmetric key associated with a token that was used to authenticate to the IRM server. The content information rights validity time part 607 may be used to store a validity time of the information rights given for the particular content part.

In the example use license data structure given above, the granted information rights part 606 may be used to store combined results of different policy evaluators and may comprise actions from different applications.

Another Exemplary Method

Earlier in this document a situation was considered in which data is created using a first application. That application has functionality to specify user roles which may be used to specify an information rights policy using an IRM system such as that described above. In this case the claim provider for the IRM system comprises a system for checking the user roles of the application.

Suppose that it is required to export the created data to a second application. The data is saved using that second application and is then disseminated. However, it is required to use an information rights policy to control use of the disseminated data. The second application does not have understanding of the user roles of the first application and so that information cannot easily be used to set up the information rights policy. Instead another claim provider needs to be used which is associated with the second application. However, this is inconvenient in many situations and can lead to errors and/or failure to specify information rights policies at all. This is because it is usually more straightforward to allow an author to specify information rights policy information using the first application in which the data is created.

Using the improved IRM system of FIG. 3 it is possible for a first and second application to be used in this way. For example, suppose that the first application is the originating application 304 and the second application is the target application 308. The originating application 304 might be a financial data processing application and the target application might be a word processing application for example. Two policy evaluators 301 are provided, one associated with the originating application and one associated with the target application. In addition, two claim providers are given, one associated with the originating application and one with the target application.

The author creates a content using the financial data processing application and exports that content to a document of the target application type. Information rights policy information is created and stored in the issue license at this stage. Some of the information rights policy information comprises a read only right for users of the financial data processing application having a role of specified type. Additionally, the information rights policy information comprises read only rights for particular recipients having an identity specified using an identity provider such as an organization's directory (e.g. LDAP directory). The information rights policy information thus comprises information rights policies of two different types, one associated with the financial data processing application and one associated with the organization's directory.

The method of FIG. 4 is followed such that recipients of the document have read only rights providing they meet the information rights policy and claims requirements. Thus as shown in this example, it is not essential for the originating application and the target application to be the same. In addition it is possible to protect content of a document of the target application using information rights expressed using the originating application.

Another Example System

Figure 7:
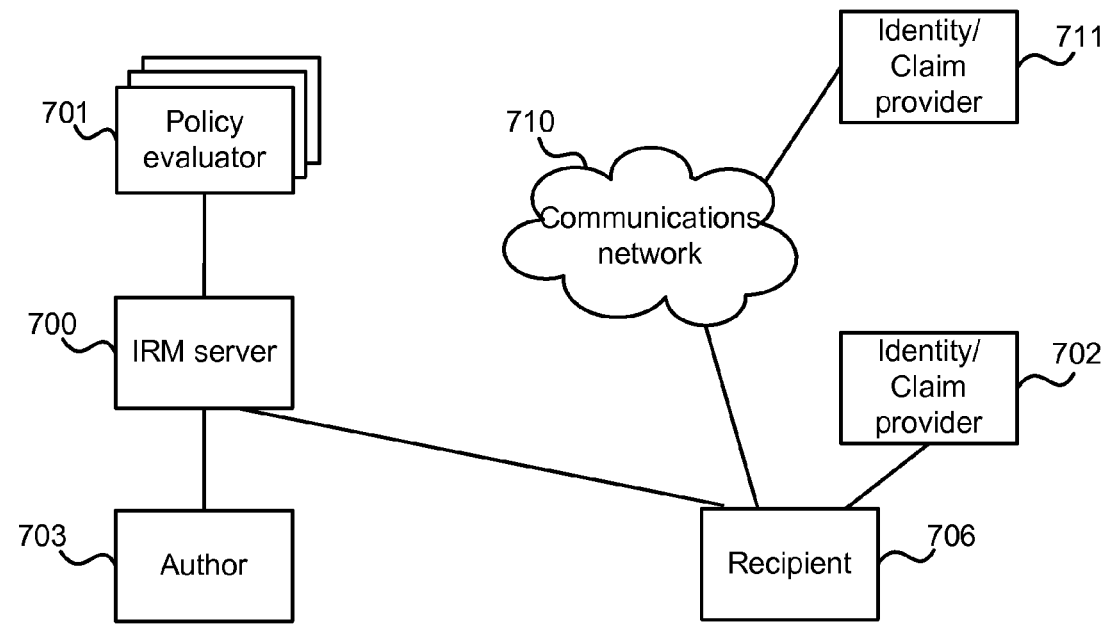
FIG. 7 is a schematic diagram of another example information rights management system.

FIG. 7 shows an example of another IRM system. In this case the arrangement is similar to that of FIG. 3 with a single IRM server 700 in communication with one or more policy evaluators 701. An author 703 and a recipient 706 are in communication with the IRM server 700 and the recipient has access to a first claim provider 702. However, in this example, the recipient also has access to one or more second claim providers 711 via a communications network 710. For example, the second claim provider 711 may be in a different enterprise or trust domain from the first claim provider. At least one of the policy evaluators 701 is arranged to trust authorization and optionally authentication tokens provided by the second claim provider 711. The term "trust" is used here to mean that at least one of the policy evaluators is arranged to accept and interpret authorization and optionally authentication tokens provided by the second claim provider 711. As in FIG. 3, the claim providers may also act as identity providers. Alternatively, separate identity providers may be used.

The term "trust domain" is used to refer to the set of systems and/or applications which share a single identity provider in order to authenticate to each other using the authorization tokens from that identity provider.

Another Example System

Figure 8:
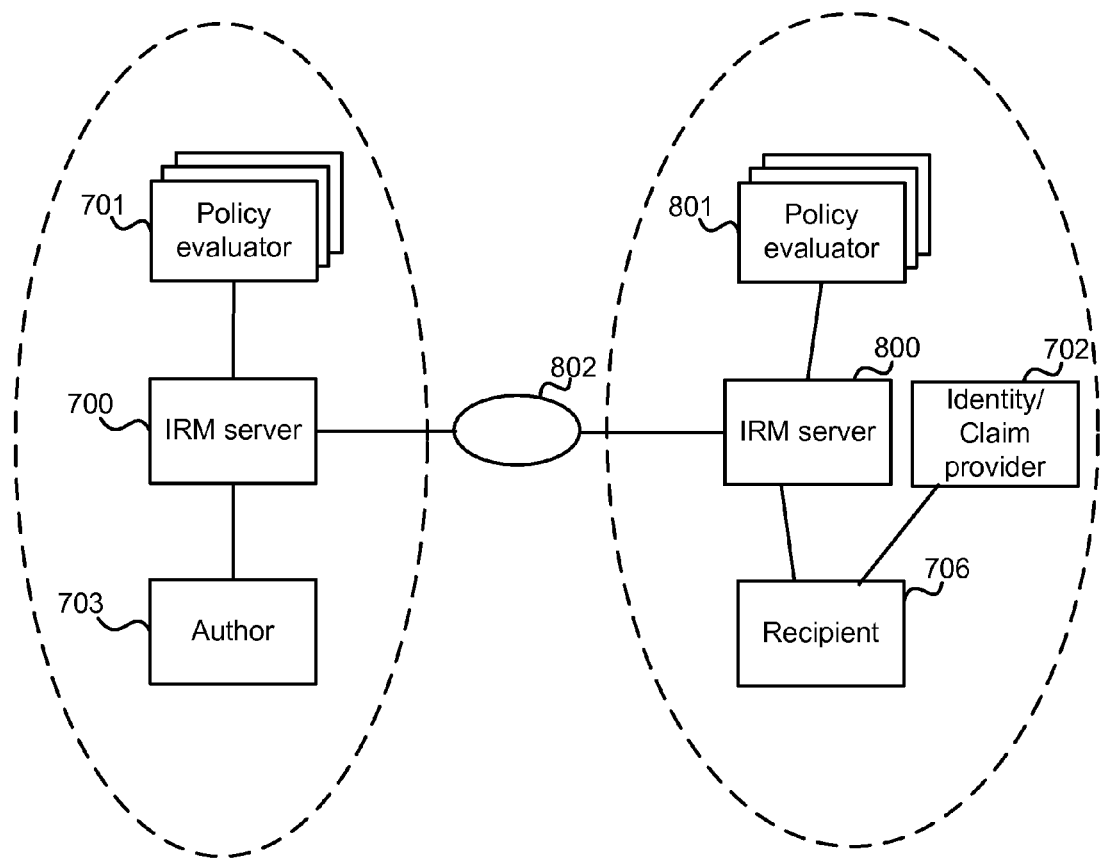
FIG. 8 is a schematic diagram of another example information rights management system.

FIG. 8 shows another example of an IRM system. Here there are two IRM servers 700, 800 but a single claim provider 702. The IRM servers 700, 800 are connected via a communications network 802 and may be in different enterprises or trust domains as indicated by the dotted lines. A first one of the IRM servers 700 is connected to policy evaluators 701 and to at least one author 703. The second IRM server 800 is also connected to policy evaluators 801 as well as to a recipient 706 which has an associated claim provider 702.

In this example, the recipient 706 is registered with the second IRM server 800. Thus the recipient 706 is unable to request a use license directly from the first IRM server 700. Instead the recipient 706 requests the use license from the second IRM server 800 and that IRM server forwards the request to the first IRM server 700 with which it has a trust relationship. That is, the first and second IRM servers are arranged to accept and interpret communications from one another. This arrangement enables independent, global claim providers to be provided. Such claim providers (e.g. 702 of FIG. 8) are able to issue authorization tokens for validation of corresponding authorization policies in different IRM domains (where the IRM domains are indicated by the dotted lines in FIG. 8).

In a similar manner it is also possible to use more than two IRM servers where each IRM server is in communication with and trusted by at least one other IRM server.

Another Example System

Figure 9:
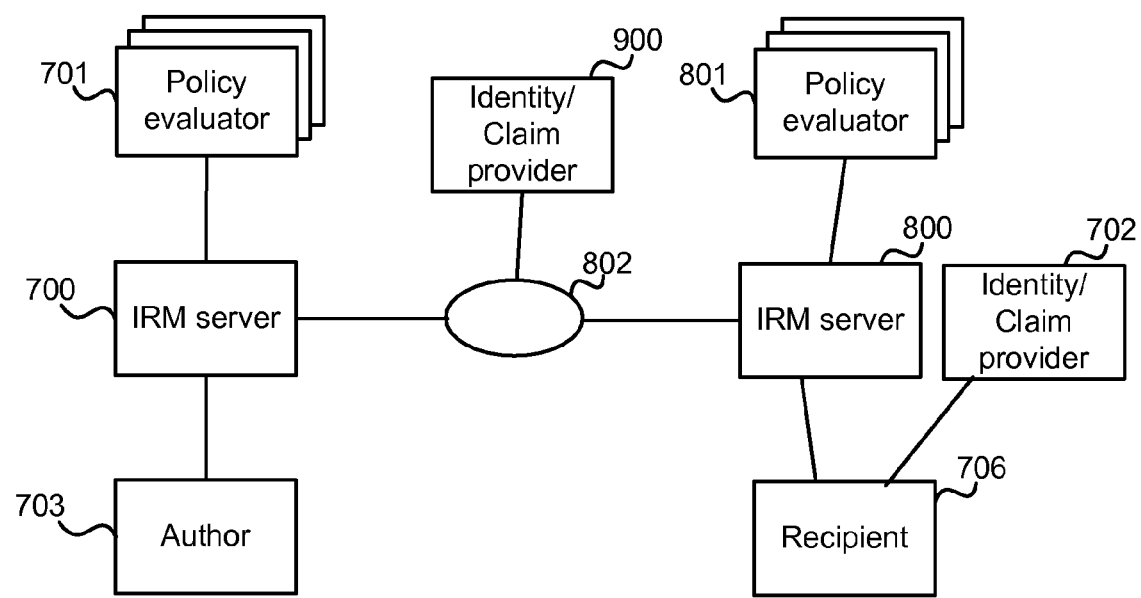
FIG. 9 is a schematic diagram of another example information rights management system.

FIG. 9 shows another example IRM system. Here the arrangement is the same as that of FIG. 8 except that a second claim provider 900 is connected to the communications network 802 between the first and second IRM servers. As in FIG. 8 the recipient 706 is able to request a use license from the second IRM server 800 and that IRM server forwards the request to the first IRM server 700 with which it has a trust relationship. The recipient is able to use claim information provided by either or both of the first and second claim providers when it makes its request for a use license.

In some embodiments the IRM client at the author interacts with the originating application to automatically (or manually) create information rights policy information to be included in the issue license.

For example, a graphical user interface may be displayed at the author machine to enable an end user to select policy evaluators. A policy builder graphical user interface may be displayed in order to enable an end user to create a policy in an evaluator's policy language.

In some examples, each policy evaluator is able to accept authorization tokens from one or more claim providers of a specified type. The policy builder graphical user interface may enable an author to specify claim providers. Alternatively, default settings for the claim provider information may be used.

Exemplary Computing-Based Device

Figure 10:
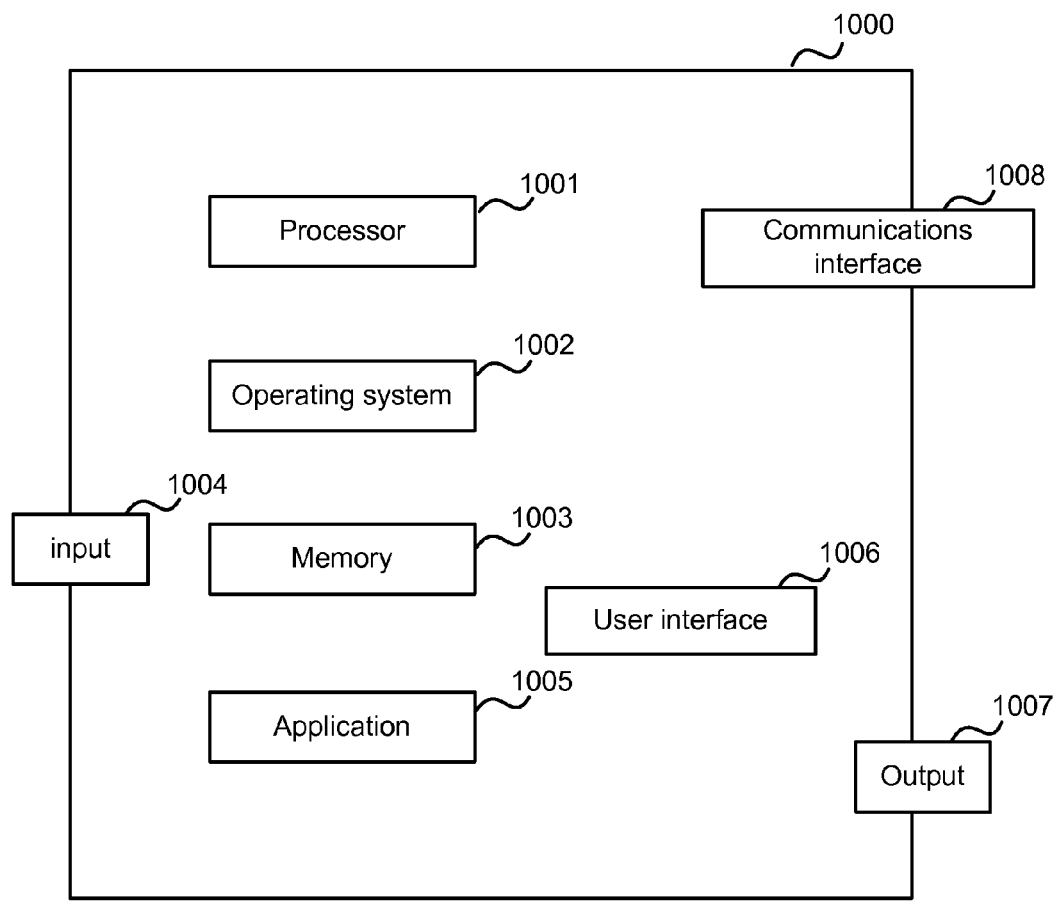
FIG. 10 illustrates an exemplary computing-based device in which embodiments of an information rights management server may be implemented.

FIG. 10 illustrates various components of an exemplary computing-based device 1000 which may be implemented as any form of a computing and/or electronic device, and in which embodiments of an information rights management server may be implemented.

The computing-based device 1000 comprises one or more inputs 1004 which are of any suitable type for receiving input from an author comprising issue license requests and other input. The device also comprises communication interface 1008 for communicating with other entities such as policy evaluators, other information rights management servers, recipients, authors and other communications network nodes.

Computing-based device 1000 also comprises one or more processors 1001 which may be microprocessors, controllers or any other suitable type of processors for processing computing executable instructions to control the operation of the device in order to carry out the functions of an information rights management server. Platform software comprising an operating system 1002 or any other suitable platform software may be provided at the computing-based device to enable application software 1005 to be executed on the device.

The computer executable instructions may be provided using any computer-readable media, such as memory 1003. The memory is of any suitable type such as random information memory (RAM), a disk storage device of any type such as a magnetic or optical storage device, a hard disk drive, or a CD, DVD or other disc drive. Flash memory, EPROM or EEPROM may also be used.

An output 1007 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may information the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of information rights management at an information rights management server comprising the steps of:
   receiving a request from an author for an issue license at the information rights management server for a piece of content, the request comprising information rights policy details selected by the author;
   issuing an issue license to the author on the basis of the information rights policy details, the issue license comprising information about one or more policy evaluators, each policy evaluator being independent of the information rights management server, the issue license including:
      a content rights information section;
      a content reference that identifies the piece of content with respect to an originating application of the piece of content;
      a content key that is used to encrypt the piece of content; and
      a policy container that includes claim provider information, and endpoint reference, an authorization token type, claim type requirements, and holds information about how to combine results from each of the policy evaluators;
   receiving a request for a use license from a recipient of the piece of content;
   sending an evaluation request to each of the policy evaluators, the evaluation request including one or more authorization tokens and a list of requested actions selected by the recipient, the authorization tokens being provided by an identity provider and to authenticate the recipient to the information rights management server; and
   issuing the use license on the basis of responses received from the policy evaluators.

2. The method as claimed in claim 1 wherein issuing the issue license comprises generating the issue license such that it comprises a policy container.

3. The method as claimed in claim 1 wherein issuing the issue license comprises generating the issue license such that it comprises:
   a policy container arranged to hold at least a reference to information about the information rights policy detail, and
   at least a reference to information about how to combine results from each of the policy evaluators.

4. The method as claimed in claim 1 wherein issuing the issue license comprises generating the issue license such that it comprises a policy container holding information rights policy details.

5. The method as claimed in claim 1 wherein issuing the issue license comprises generating the issue license such that it comprises:
   a policy container holding information rights policy details.

6. The method as claimed in claim 1 wherein the issue license comprises, for each policy evaluator, information about one or more associated claim providers.

7. The method as claimed in claim 1 wherein the issue license comprises, for each policy evaluator, an information rights policy field arranged to store information to be sent to the respective policy evaluator.

8. The method as claimed in claim 1 which further comprises receiving the request for the use license from the recipient, that request comprising claim information associated with the recipient.

9. An information rights management server comprising:
   an input arranged to receive a request for an issue license for a piece of content, the request comprising information rights policy details, the piece of content being associated with an originating application and a target application, the issue license including:
      a content rights information section;
      a content reference that identifies the piece of content with respect to an originating application of the piece of content;
      a content key that is used to encrypt the piece of content; and
      a policy container that includes claim provider information, an endpoint reference, an authorization token type, claim type requirements, and holds information about how to combine results from each of the policy evaluators;
   a communications link to a policy evaluator for the originating application and a policy evaluator for the target application with each policy evaluator analyzing different information rights policies, each policy evaluator being independent of the information rights management server;

a processor arranged to generate an issue license on the basis of the different information rights policy details and comprising information about the policy evaluators;

an input arranged to receive a request for a use license; and an output arranged to issue a use license on the basis of responses received from the policy evaluators.

10. The information rights management server as claimed in claim 9 wherein the processor is arranged to generate the issue license such that it comprises a policy container.

11. The information rights management server as claimed in claim 10 wherein the processor is arranged to generate the issue license such that it comprises a policy container arranged to hold at least a reference to information about the information rights policy details and at least a reference to information about how to combine results from each of the policy evaluators.

12. The information rights management server as claimed in claim 10 wherein the processor is arranged to generate the issue license such that it comprises a policy container holding information rights policy details and information about how to combine results from each of the policy evaluators.

13. The information rights management server as claimed in claim 9 wherein the processor is arranged to generate the issue license such that it comprises, for each policy evaluator, information about one or more associated claim providers.

14. An information rights management system comprising:
an information rights management server;
at least one policy evaluator, the policy evaluator being independent of the information rights management server and in communication with the information rights management server;
a first information rights management client in communication with the information rights management server and providing an issue license to an author, the issue license including:
a content rights information section;
a content reference that identifies the piece of content with respect to an originating application of the piece of content;
a content key that is used to encrypt the piece of content and
a policy container that includes claim provider information, an endpoint reference, an authorization token type, claim type requirements, and holds information about how to combine results from each of the policy evaluators;
a second information rights management client in communication with the information rights management server and provided at a recipient.

15. The information rights management system as claimed in claim 14 which further comprises at least one claim provider accessible by the second information rights management client at the recipient domain.

16. The information rights management system as claimed in claim 14 which further comprises a first and a second claim provider accessible by the second information rights management client at the recipient domain, the first and second claim providers each being in communication with one or more of the policy evaluators.

17. The information rights management system as claimed in claim 14 which further comprises a second information rights management server in communication with the first information rights management server and wherein the first and second information rights management servers are arranged to accept and interpret communications from one another.

18. The information rights management system as claimed in claim 14 which comprises a plurality of information rights management servers.

19. The information rights management system as claimed in claim 14 which further comprises a second information rights management server and a first and a second claim provider accessible by the second information rights management client at the recipient domain, the first and second claim providers each being in communication with one or more of the policy evaluators.

20. The information rights management system as claimed in claim 14 which further comprises a second information rights management server and wherein the client at the author is registered with the first server and the client at the recipient is registered with the second server.

* * * * *

UNITED STATES PATENT AND TRADEMARK OFFICE
CERTIFICATE OF CORRECTION

PATENT NO.        : 7,913,309 B2                          Page 1 of 1
APPLICATION NO.   : 11/762619
DATED             : March 22, 2011
INVENTOR(S)       : Dmitry V. Starostin et al.

It is certified that error appears in the above-identified patent and that said Letters Patent is hereby corrected as shown below:

In column 11, line 67, in Claim 1, delete "and" and insert -- an --, therefor.

In column 12, line 23, in Claim 3, delete "detail," and insert -- details; --, therefor.

In column 12, line 53, in Claim 9, delete "including:" and insert -- including; --, therefor.

In column 13, line 39, in Claim 14, delete "including:" and insert -- including; --, therefor.

In column 14, line 1, in Claim 14, delete "content" and insert -- content; --, therefor.

Signed and Sealed this
Nineteenth Day of July, 2011

David J. Kappos
*Director of the United States Patent and Trademark Office*